United States Patent
Schwegler et al.

(10) Patent No.: US 7,188,789 B2
(45) Date of Patent: Mar. 13, 2007

(54) ATOMISING NOZZLE

(75) Inventors: Helmut Schwegler, Pleidelsheim (DE); Ian Faye, Stuttgart (DE); Markus Gesk, Karlsbad (DE); Frank Miller, Ilsfeld (DE); Hartmut Albrodt, Tamm (DE); Franz Thoemmes, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/524,221

(22) PCT Filed: Jul. 3, 2003

(86) PCT No.: PCT/DE03/02232

§ 371 (c)(1),
(2), (4) Date: Feb. 8, 2005

(87) PCT Pub. No.: WO2004/035467

PCT Pub. Date: Apr. 29, 2004

(65) Prior Publication Data

US 2005/0258281 A1 Nov. 24, 2005

(30) Foreign Application Priority Data

Oct. 14, 2002 (DE) ................. 102 47 763

(51) Int. Cl.
*B05B 1/14* (2006.01)
(52) U.S. Cl. .............. 239/555; 239/419; 239/426; 239/427; 239/434; 239/499; 239/500; 239/504
(58) Field of Classification Search ............... 239/418, 239/419, 426, 427, 433, 434, 499, 500, 504, 239/554, 555
See application file for complete search history.

(56) References Cited

U.S. PATENT DOCUMENTS

| | | | | |
|---|---|---|---|---|
| 2,701,738 A | * | 2/1955 | Cerasi | 239/554 |
| 3,737,105 A | * | 6/1973 | Arnold et al. | 239/500 |
| 3,971,847 A | | 7/1976 | Houseman | |
| 4,700,894 A | * | 10/1987 | Grzych | 239/555 |
| 5,083,709 A | * | 1/1992 | Iwanowski | 239/555 |
| 5,829,687 A | * | 11/1998 | Byles | 239/555 |

FOREIGN PATENT DOCUMENTS

| | | |
|---|---|---|
| DE | 933 301 | 9/1955 |
| DE | 44 43 320 | 6/1995 |
| DE | 100 02 005 | 8/2001 |
| DE | 100 10 071 | 9/2001 |
| DE | 100 22 073 | 11/2001 |
| FR | 2 307 127 | 11/1976 |

* cited by examiner

*Primary Examiner*—Steven J. Ganey
(74) *Attorney, Agent, or Firm*—Kenyon & Kenyon LLP

(57) ABSTRACT

An atomizer nozzle (1) for fuels, in particular for feeding them into a chemical reformer for obtaining hydrogen, has a nozzle body (2) containing spray-discharge orifices (3) that discharge into a metering space, and has at least one metering aperture (6). The spray-discharge orifices (3) are situated at elevation levels (4) so as to have a radial directional component with respect to a center line (10) of the nozzle body (2), each elevation step having at least one spray-discharge orifice (3), and the spray-discharge orifices (3) of at least one elevation level (4) being connected to at least one channel (14) of a nozzle-body insert (5) that has at least one flow-through opening (11).

11 Claims, 2 Drawing Sheets

ATOMISING NOZZLE

BACKGROUND INFORMATION

In fuel-cell-supported transportation systems, so-called chemical reformers are used for extracting the required hydrogen from hydrocarbon-containing fuels.

All the substances needed by the reformer for the course of reaction, such as air, water, and fuel, are ideally supplied to the reformer in the gaseous state. However, since the fuels, such as methanol or gasoline, and water are preferably present onboard the transportation system in liquid form, they must be heated shortly before being supplied to the reformer, in order to vaporize them. This requires a pre-evaporator capable of providing adequate quantities of gaseous fuel and water vapor, the waste heat of the reformer mostly being used for vaporization.

Since the hydrogen is normally consumed immediately, chemical reformers must be capable of adjusting the production of hydrogen to the demand without delay, e.g. in response to load changes or during start phases. Especially in the cold start phase, additional measures must be taken, since the reformer does not provide any waste heat. Conventional evaporators are not capable of generating adequate quantities of gaseous reactants without delay.

So-called catalytic burners provide the temperature required for the chemical reaction, in which, e.g. the fuel is reformed to form, among other things, hydrogen. Catalytic burners are components that have surfaces coated with a catalyst. In these catalytic burners, the fuel/air mixture is converted into heat and exhaust gases, the generated heat being conducted to the suitable components such as the chemical reformer or an evaporator via, for example, the (lateral) surfaces and/or via the warm exhaust-gas stream.

The conversion of fuel into heat is highly dependent on the size of the fuel droplets striking the catalytic layer. The smaller the size of the droplets and the more uniformly the catalytic layer is wetted with the fuel droplets, the more completely the fuel is converted into heat and the higher the efficiency. In this way, the fuel is also converted more quickly and pollutant emissions are reduced. Fuel droplets that are too large in size result in the coating of the catalytic layer and hence, in a slow conversion rate. This leads to, e.g. poor efficiency, especially in the cold start phase.

It is therefore practical to introduce the fuel into the reformer/catalytic burner in a finely dispersed form, with the aid of an atomization device, in which case, provided that there is a sufficient supply of heat, the vaporization process is improved by the high surface area of the finely dispersed fuel.

Devices for metering fuels into reformers are known, for example, from U.S. Pat. No. 3,971,847. According to this document, metering devices located relatively far away from the reformer are used to meter the fuel via long supply lines and a simple nozzle into a temperature-adjusted material stream. In the process, the fuel first strikes baffle plates positioned downstream from the nozzle outlet orifice, which are designed to swirl and disperse the fuel before arriving, via a relatively long vaporization section (path) necessary for the vaporization process, at the reaction region of the reformer. The long supply line allows the metering device to be insulated from thermal influences of the reformer.

A particularly disadvantageous feature in the devices known from the above-mentioned document is the fact that, due to the simple construction of the nozzle and the positioning of the baffle plates, a targeted metering of fuel, for example into regions of the reformer that have a large supply of heat, is possible only to an insufficient degree. This leads to the need for a relatively large space due to the necessity of a long and voluminous vaporization section.

Furthermore, problems arise in cold start operation, since long and voluminous vaporization sections are slow to heat up and also give off a relatively large amount of heat unused. The set-ups of nozzle and baffle plates described in U.S. Pat. No. 3,971,847 particularly do not allow the interior surface of a hollow cylinder to be uniformly wetted with fuel and, in so doing, do not allow certain surfaces of the hollow cylinder to be excluded from being wetted with fuel, or the quantity of the metered fuel to be adjusted to the distribution of the supply of heat in the metering space. Even the shape of the fuel cloud resulting from the metering process can be influenced only to an insufficient degree.

A further disadvantage is that the shape of the fuel cloud or the distribution of the dosed-in fuel may not be adequately controlled by adjusting the baffle plates.

SUMMARY OF THE INVENTION

The atomizer nozzle according to the present invention has the advantage that the fuel may be introduced in accordance with the supply of heat prevailing in the metering space. This optimizes the process of vaporizing the fuel and allows it to take place in a small, rapidly heated space. In addition, it is possible to improve the operating performance, since, for example, measuring paths or measuring surfaces, sensors for instance, may be largely excluded from being acted upon by fuel. The geometry of the discharged fuel or fuel cloud is singularly adaptable to the circumstances prevailing in the metering space and to the conditions given thereby.

In particular, the modular construction of the atomizer nozzle allows the shape of the fuel cloud and the respective amounts of fuel thereby injected to be changed rapidly and easily, in order to optimize the atomization operation. This allows considerable cost reductions in adapting to the specific metering space and the conditions prevailing in it.

In a first advantageous refinement, the nozzle body of the atomizer nozzle is formed as a hollow cylinder. This allows the atomizer nozzle to be manufactured very easily, precisely, and therefore inexpensively. Moreover, the atomizer nozzle may thus be manufactured, for example, from standardized semi-finished parts, e.g. from standardized metal tubes.

In addition, it is advantageous when the nozzle body is completely or partially made of nozzle-body inserts. In this manner, e.g. the overall length of the atomizer nozzle may be changed and adapted to the requirements very flexibly, simply, rapidly, and with the use of only a few simple tools. In particular, this allows the atomization operation to be optimized in a rapid and step-by-step manner, for example, in a test phase or development phase. In particular, the number of spray-discharge orifices of an elevation level and the spacings of the elevation levels may also be changed very rapidly and cost-effectively by exchanging nozzle-body inserts.

In addition, it is advantageous to provide the nozzle-body inserts with internal threads or external threads on the influx and/or discharge end, by which they may be screwed to the nozzle body and/or to another nozzle-body insert, so as to be hydraulically sealed. In this manner, the nozzle-body inserts may be assembled and disassembled in a particularly simple, easy, and reliable manner. Furthermore, the nozzle-body inserts may be advantageously press-fitted, bonded, and/or welded, in particular laser-welded, to the nozzle body in a hydraulically sealed manner, which means that the jointing method may be more effectively adapted to the environmental conditions and requirements.

In a further advantageous refinement, a gas-supply port for supplying a gas, for example air or residual gases from a fuel-cell process or reforming process, is situated between the spray-discharge orifices of the first elevation level and the metering aperture. This allows the preparation (conditioning) of the mixture to be advantageously influenced.

Moreover, the atomizer nozzle may be refined in that at least one additional spray-discharge orifice is situated downstream from the last spray-discharge orifice of an elevation level in the direction of the fuel flow, the additional spray-discharge orifice having an axial component with respect to the center line of the nozzle body. This allows the atomization of fuel to be adapted even more effectively to the conditions prevailing in the metering space.

Moreover, the shape of the flow-through opening of the nozzle-body inserts may influence the flow behavior or the pressure conditions (compression ratios) in the nozzle body. In this regard, flow-through openings having a trapezoidal, a rectangular, or a combination of a rectangular and a trapezoidal cross section are particularly advantageous, especially since they can be manufactured simply, precisely, and thus inexpensively. It is furthermore advantageous to implement the flow-through opening in multiple uniform cross sections of varying size, for example as a stepped bore hole.

If the nozzle body includes sections of reduced wall thickness, then particularly the thermal conductivity in the direction of the metering point will be reduced. Thus, a metering device situated in that location is protected from excessive heating. The sections of reduced wall thickness may also influence the spray-off (radiation) geometry if they are situated in the region of the spray-discharge orifices. If the nozzle body is formed by the nozzle-body inserts, then the wall thicknesses of individual nozzle-body inserts may be reduced in sections, with the same effects.

DETAILED DESCRIPTION

Figure 1:
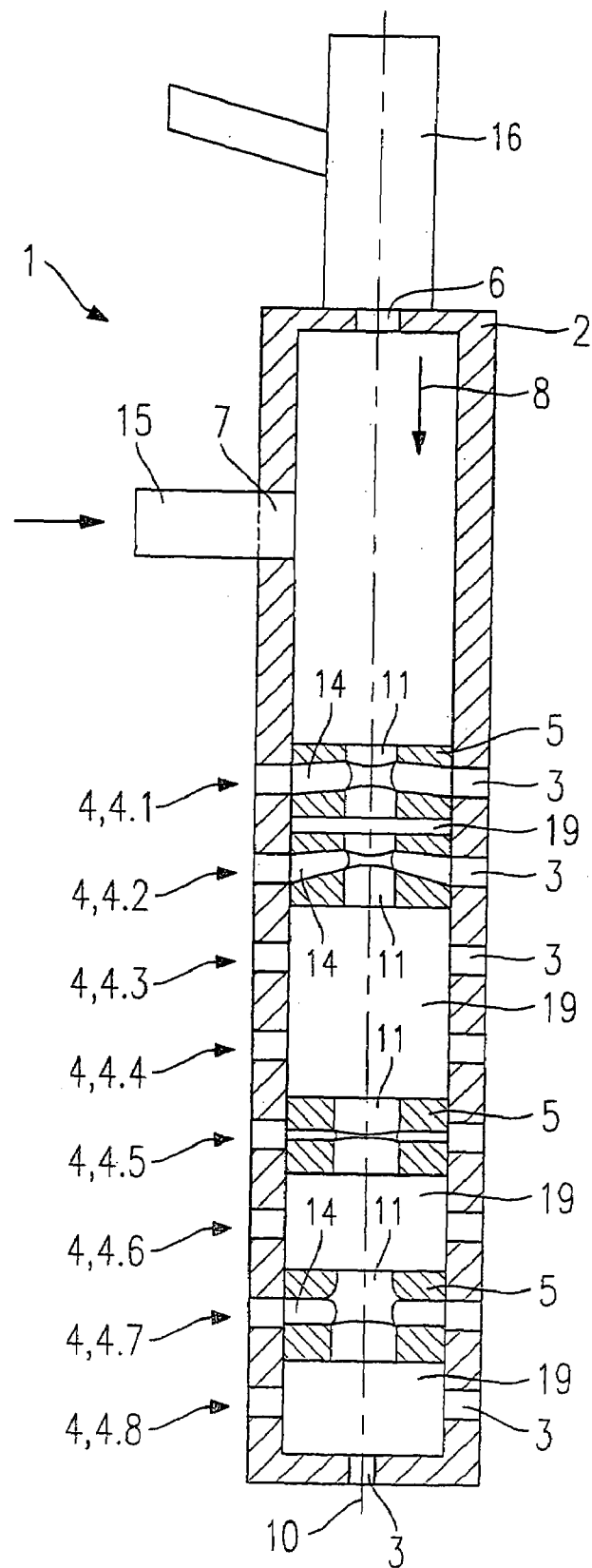
FIG. 1 shows a schematic sectional view of an exemplary embodiment of an atomization nozzle according to the present invention.

The exemplary embodiments described below of atomizer nozzles designed according to the present invention allow for simple metering and atomization in a hot atmosphere, while providing a robust, flexible, and therefore more cost-effective construction, and allow for application in different spatial constellations and the use of standard low-pressure fuel injectors.

Identical parts are provided with the same reference numerals in all of the figures. The arrows represent the respective fuel and gas flows.

An exemplary embodiment, schematically represented in FIG. 1, of an atomizer nozzle 1 according to the present invention is in the form of an atomizer nozzle 1 for the use of low-pressure fuel injectors 16. Atomization nozzle 1 is particularly suitable for feeding and atomizing fuel into a metering space (not shown) of a chemical reformer (not shown) for obtaining hydrogen.

In this exemplary embodiment, atomizer nozzle 1 of the present invention has a nozzle body 2 in the shape of a hollow cylinder, having a metering aperture 6 at the top centrally situated with respect to a center line 10 of nozzle body 2. This is followed, in the direction of fuel flow 8, by a gas supply port 7 situated on the side wall of nozzle body 2, by eight elevation levels 4, each having a spray-discharge orifice 3 situated at a right angle to center line 10 of nozzle body 2, and finally by the end of nozzle body 2 opposite to metering aperture 6 and having a spray-discharge orifice 3.

In this exemplary embodiment, a nozzle-body insert 5 having a coaxial flow-through opening 11 is positioned in nozzle body 2 on the level of first elevation level 4.1, second elevation level 4.2, fifth elevation level 4.5, and seventh elevation level 4.7. Gaps 19 are located between nozzle-body inserts 5 and between nozzle-body insert 5 situated at the level of seventh elevation level 4.7, and the end of nozzle body 2 opposite to metering aperture 6. The gaps may also be absent from other exemplary embodiments. In this exemplary embodiment, center lines 12 of flow-through openings 11 coincide with center line 10 of nozzle body 2.

Nozzle-body inserts 5 are disk-shaped and have channels 14; in this exemplary embodiment, one channel 14 connecting flow-through opening 11 to, in each instance, only one spray-discharge orifice 3. In this exemplary embodiment, channels 14 take the form of bore holes. At their circumference, nozzle-body inserts 5 are sealingly joined to nozzle body 2 in such a manner, that no fuel or gas may penetrate between nozzle body 2 and the circumference of nozzle body insert 5. In this exemplary embodiment, nozzle-body inserts 5 are forced into nozzle body 2. They may also be welded or screwed into nozzle body 2. In addition, they may be attached to other nozzle-body inserts 5 in a hydraulically sealed manner, via influx-side or discharge-side external threads 18 or internal threads 17, they then being fit into nozzle body 2 in such a manner, that only negligible amounts of gas and/or fuel can penetrate between nozzle body 2 and nozzle-body insert 5.

Flow-through openings 11 of nozzle-body inserts 5 take the form of a bore having a rectangular cross-section. The shape of nozzle-body inserts 4, their fitting position, and the shape or the combination of shapes of flow-through openings 11 may be arbitrarily combined and varied for controlling the fuel flow, gas flow, and pressure conditions. The diameter and the shape of the cross-section of channels 14 may be varied, as well.

The fuel is metered via metering aperture 6, in this exemplary embodiment via a low-pressure fuel injector 16, into atomizer nozzle 1, i.e. nozzle body 2, and then flows in direction of fuel flow 8 along center line 10 of nozzle body 2, past gas-supply port 7, through which residual gases and/or air are fed into nozzle body 2 via a gas pipe 15, to nozzle body insert 5 situated at first elevation level 4.1, where the fuel or the fuel/gas mixture passes through flow-through opening 11. In this context, a part of the fuel is distributed to channels 14 and directed to spray-discharge orifices 3, at which the fuel or the fuel/gas mixture is discharged into the metering space not shown.

On the discharge end, the remaining part of the fuel or fuel/gas mixture not distributed to channels 14 exits flow-through opening 11 and flows into space 19 situated downstream from it in fuel-flow direction 8. In an analogous manner, the remaining fuel or fuel/gas mixture is distributed, in each instance, through nozzle-body inserts 5 situated downstream from it in fuel-flow direction 8. On third elevation level 4.3, fourth elevation level 4.4, sixth elevation level 4.6, and eighth elevation level 4.8, which have no nozzle-body inserts 5, the specific portion of fuel or fuel/gas mixture directly enters respective spray-discharge orifices 3 from space 19 and is discharged into the metering space not shown.

Figure 2:
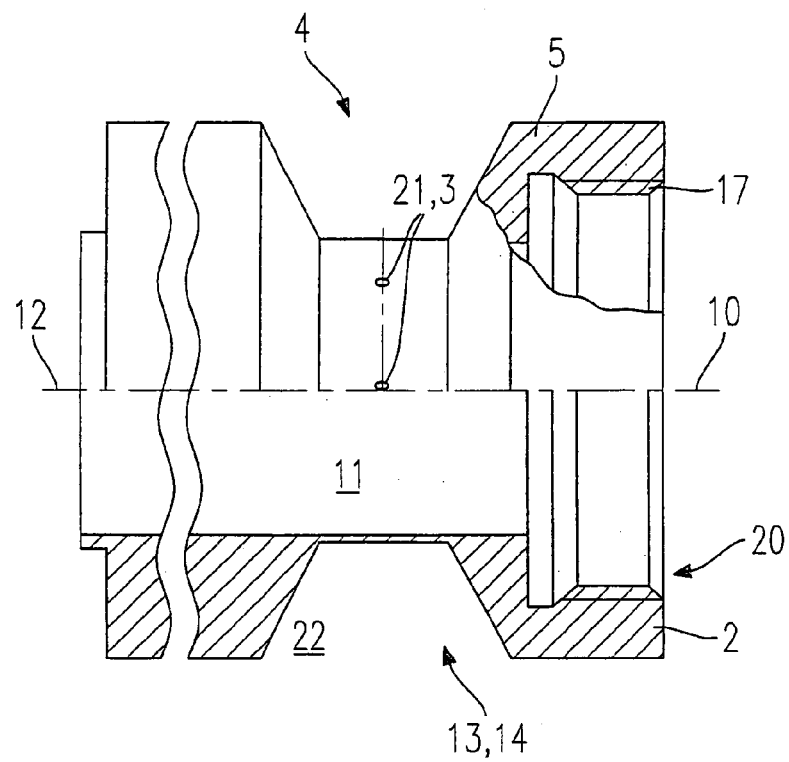
FIG. 2 shows a schematic representation of a first specific embodiment of a nozzle-body insert.

FIG. 2 shows a first specific embodiment of a nozzle-body insert 5. In this exemplary embodiment, flow-through opening 11 has, on the influx end, an expanded inner diameter 20 containing internal threads 17 and is coaxially situated in nozzle-body insert 5.

According to the present invention, nozzle-body insert 5 may be situated in nozzle body 2 or even constitute nozzle body 2 completely or partially.

If nozzle-body insert 5 is situated in nozzle body 2 shown in FIG. 1, its structure is as follows:

Channel 14 of nozzle-body insert 5 is formed by bores 21 running on a line perpendicular to center line 12 and by a trapezoidal indentation 22 of the outer diameter of nozzle-body insert 5 running radially around center line 12 of flow-through opening 11. Bore 21 and indentation 22 each form a part of channel 14.

A portion of the fuel or the fuel/gas mixture flows from flow-through opening 11 through bores 21 and indentation 22, in order to be injected through unshown spray-discharge orifices 3 of nozzle body 2 shown in FIG. 1, into the metering space not shown.

If nozzle body 2 is formed by the at least one nozzle-body insert 5, its structure is as follows:

Bores 21 running on a line, perpendicularly to center line 12 of flow-through opening 11, form channels 14 and spray orifices 3. Trapezoidal indentation 22 of the outer diameter of nozzle-body insert 5, running radially around center line 12 of flow-through opening 11, forms a section 13 of reduced wall thickness, which is used, for example, for heat insulation.

A portion of the fuel or fuel/gas mixture flows from flow-through opening 11, through channel 14 taking the form of bores 21, in order to be injected, at the end of the same bore 21 forming spray-discharge as well, into the metering space not shown.

Figure 3:
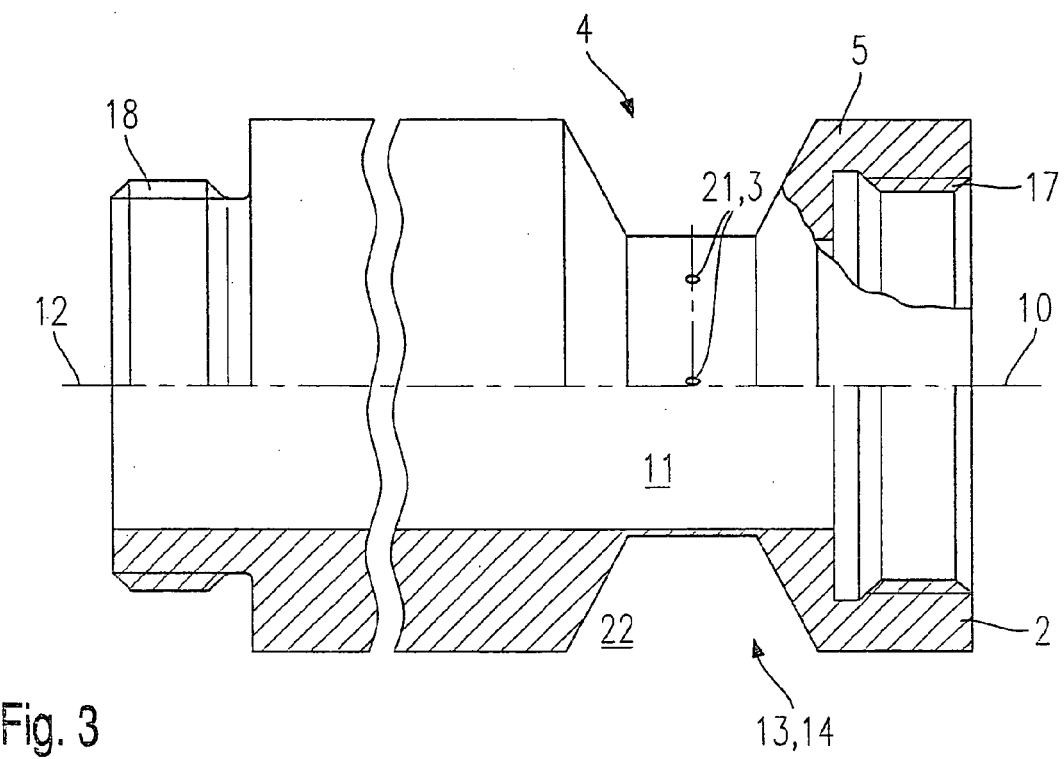
FIG. 3 shows a schematic representation of a second specific embodiment of a nozzle-body insert.

FIG. 3 shows a second specific embodiment of a nozzle-body insert 5 substantially similar to the first specific embodiment. In contrast to the specific embodiment represented in FIG. 2, nozzle-body insert 5 has a somewhat longer axial profile and outer threads 18 situated on the discharge side. Outer threads 18 are situated on the discharge-side end of nozzle-body insert 5, the outer diameter of the discharge-side end being reduced.

The present invention is not limited to the exemplary embodiments described but is applicable to any other atomization systems.

What is claimed is:

1. An atomizer nozzle for a fuel, comprising:
a modular system of a nozzle body formed as a hollow cylinder and at least one disk-shaped nozzle body insert;
the nozzle body having spray-discharge orifices that discharge into a metering space, and having at least one metering aperture, the spray-discharge orifices being situated at elevation levels so as to have a radial directional component with respect to a center line of the nozzle body, each elevation level having at least one of the spray-discharge orifices, and the at least one spray-discharge orifice of at least one elevation level being directly connected to at least one channel of the at least one disk-shaped nozzle-body insert that has at least one flow-through opening; and wherein the at least one disk-shaped nozzle body insert has an indentation on its outer diameter forming a section of reduced wall thickness.

2. The atomizer nozzle according to claim 1, wherein the atomizer nozzle is for feeding fuels into a chemical reformer for obtaining hydrogen.

3. The atomizer nozzle according to claim 1, wherein the at least one disk-shaped nozzle-body insert includes a plurality of disk-shaped nozzle-body inserts having one of (a) internal threads and (b) external threads on at least one of an influx and a discharge side, the disk-shaped nozzle-body inserts being screwed to at least one of (a) the nozzle body and (b) another disk-shaped nozzle-body insert in a hydraulically sealed manner with the aid of the one of (a) the internal threads and (b) the external threads.

4. The atomizer nozzle according to claim 1, wherein the at least one disk-shaped nozzle-body insert is at least one of press-fitted, bonded, welded, and laser-welded, to the nozzle body in a hydraulically sealed manner.

5. The atomizer nozzle according to claim 1, wherein at least one additional spray-discharge orifice having an axial directional component with respect to the center line of the nozzle body is situated downstream from a last of the elevation levels.

6. The atomizer nozzle according to claim 1, wherein a center line of the flow-through opening of the at least one disk-shaped nozzle-body insert runs parallel to the center line of the nozzle body.

7. The atomizer nozzle according to claim 1, wherein a cross-section of the flow-through opening is one of rectangular and trapezoidal.

8. The atomizer nozzle according to claim 1, wherein the flow-through opening has at least two uniform cross-sections of different size, in the form of a stepped bore hole.

9. The atomizer nozzle according to claim 1, wherein the at least one disk-shaped nozzle body insert has the section of reduced wall thickness in its axial profile.

10. The atomizer nozzle according to claim 9, wherein the section of reduced wall thickness runs in a region of the at least one elevation level.

11. An atomizer nozzle for a fuel, comprising:
a nozzle body having spray-discharge orifices that discharge into a metering space, and having at least one metering aperture, the spray-discharge orifices being situated at elevation levels so as to have a radial directional component with respect to a center line of the nozzle body, each elevation level having at least one of the spray-discharge orifices, and the at least one spray-discharge orifice of at least one elevation level being directly connected to at least one channel of at least one nozzle-body insert that has at least one flow-through opening further comprising a gas-supply port situated in the nozzle body between a first of the elevation levels and the at least one metering aperture.

* * * * *